March 10, 1970    S. POLLARD ET AL    3,499,198
CUTOFF TOOL HAVING DEFORMABLE FIXTURING MEANS
Filed July 1, 1965    2 Sheets-Sheet 1
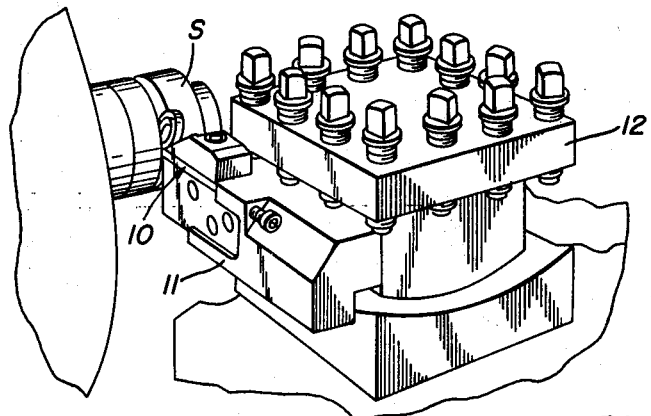
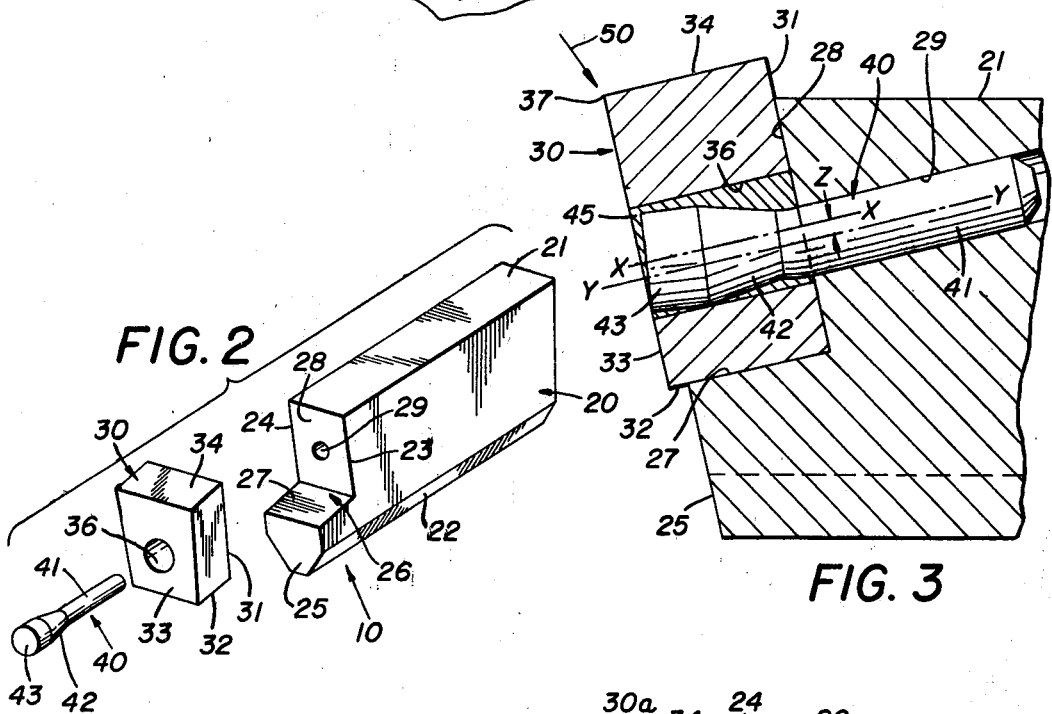
INVENTORS
SAMUEL POLLARD,
RAYMOND E. NOVKOV &
BY  WILLIAM B. STEIN
Freeman + Taylor
ATTORNEYS March 10, 1970   S. POLLARD ET AL   3,499,198
CUTOFF TOOL HAVING DEFORMABLE FIXTURING MEANS
Filed July 1, 1965   2 Sheets-Sheet 2

INVENTORS
SAMUEL POLLARD,
RAYMOND E. NOVKOV &
BY  WILLIAM B. STEIN

*Freeman + Taylor*

ATTORNEYS

United States Patent Office 3,499,198
Patented Mar. 10, 1970

3,499,198
CUTOFF TOOL HAVING DEFORMABLE FIXTURING MEANS
Samuel Pollard, Mantua, Raymond E. Novkov, Cuyahoga Falls, and William B. Stein, Barberton, Ohio, assignors to The Warner & Swasey Company, Cleveland, Ohio, a corporation of Ohio
Filed July 1, 1965, Ser. No. 468,723
Int. Cl. B26d 1/12
U.S. Cl. 29—96
14 Claims

ABSTRACT OF THE DISCLOSURE

A cutoff tool having locating and fixturing means for a hardened cutting portion. The tool having a pocket for reception of the cutting element with an aperture thereon and the cutting element also having an aperture with an offset axis. A pin being passed through the apertures and being wedged in place to both locate the cutting element in the pocket and reinforce the same after the parts are brazed together. The cutting edge of the cutting element being supported by a V-shaped portion of the pocket.

---

This invention relates to the art of metal cutting tools, and in particular has reference to method and apparatus for making improved cutting tools by the use of expendable fixturing means.

In the art of metal cutting it has long been known that a localized position of a cutting tool can be provided with an appropriate hardened insert for the purpose of more effectively accomplishing the actual cutting operations being undertaken.

Thus, and by way of example, in the field of circular saws and the like, it has long been known to provide the cutting edges of the saw teeth with carbide inserts that have greater wear properties and are thus adapted to operate under more severe conditions.

Similarly, in the art of metal cutoff, it has been known and taught that a cutting insert can be produced with an appropriate localized hardened cutoff insert so as to effectuate more efficient cutoff with the cutting tool being made up of a metal shank, and a carbide tip that engages the work.

A cutoff tool of the type just described is fully shown and described in Novkov United States Patent 2,964,833.

While localized use of carbide tips in the field of metal cutting has long been known, the use of such tips has always presented a problem with respect to location and connection, with the tip normally being brazed in place and then being machined following brazing. The result of such assembly is a tool that is rather costly to produce because of the time consuming operations of (1) locating, (2) brazing and (3) finish machining.

It has been discovered that the cost attendant with producing such items can be materially reduced by using certain expendable fixturing means that serve the dual purpose of (1) readily locating the respective parts and (2) simultaneously serving as a fixturing device for the brazing of the located parts.

It has been further found in this regard that such fixturing means can be adapted to position the part so as to preclude much of the finish machining that would otherwise be required.

Finally, it has been discovered that by making these fixturing means "expendable" that the same become a part of the finished product and thus serve to provide a greater rigidity and strength against failure than would otherwise be the case.

Production of an improved method of assembling metal cutting tools and the production of improved cutting tools resulting from the practice of this method, accordingly becomes the principal object of this invention, with other objects of the invention becoming more apparent upon a reading of the following brief specification considered and interpreted in the light of the accompanying drawings.

Figure 6:
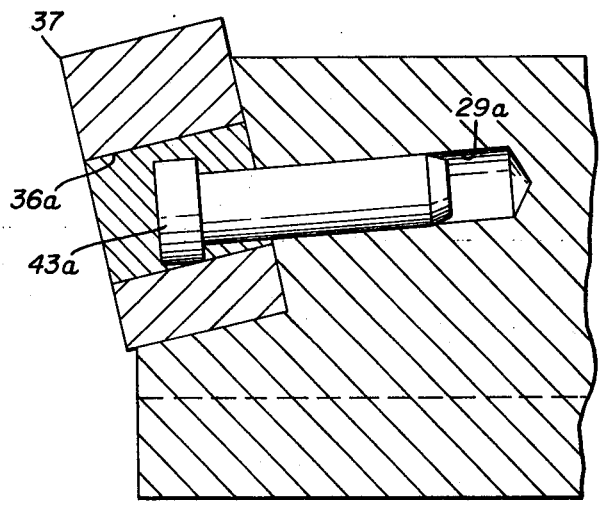
Figure 7:
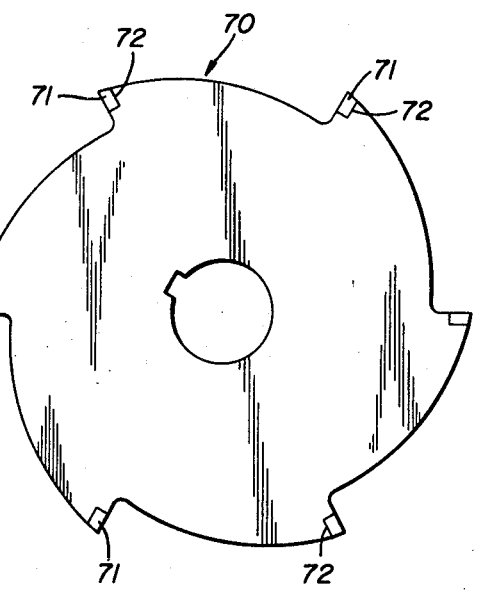
Figure 8:
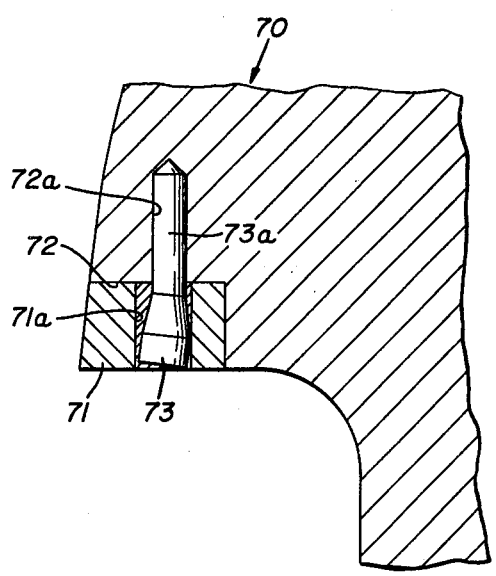

In the drawings:
FIGURE 1 is a schematic perspective view showing a cutting tool of the type being discussed in operation.
FIGURE 2 is an exploded perspective view of a cutoff insert made in accordance with the teachings of the invention.
FIGURE 3 is a vertical section taken longitudinally of the improved cutoff insert in the forward region thereof, and showing the improved fixturing means in greater detail in its assembled condition.
FIGURE 4 is a tope plan view of the improved cutoff insert.
FIGURE 5 is a front elevation of the improved cutting tool.
FIGURE 6 is a similar sectional view showing a modified form of the invention.
FIGURE 7 is a side elevation of a milling cutter having cutting tips attached in accordance with the principles of the invention.
FIGURE 8 is an enlarged sectional view detailing the method of attachment.

Referring now to the drawings and in particular to FIGURE 1, the improved cutoff insert, generally designated by the numeral 10, is shown associated with the cutoff tool 11 that is in turn carried by the clamping means 12 of a lathe, for example, so as to effectuate cutoff of revolving stock material S in a manner well taught in the aforementioned United States Patent 2,964,833.

Turning now to FIGURES 2 and 3, it wil be first noted that the insert 10 per se includes an elongate shank portion 20, having a top surface 21, a V-shaped bottom surface 22, side edges 23 and 24, and a front edge 25. A bit receiving pocket, generally designated by the numeral 26, is provided at the upper forward end of the shank 20 so as to open into the top surface 21 and the forward face 25 as clearly shown in FIGURE 2, with the pocket 26 having a substantially horizontal surface 27 as well as a connecting, substantially vertical surface 28, although in the form of the invention shown, surface 27 slants upwardly away from front edge 25 while surface 28 slants rearwardly from top surface 21.

Extending inwardly from the just described surface 28 is a fixturing recess 29 that is preferably circular in cross section as clearly shown in FIGURES 2 and 3 of the drawings with the axis Y—Y (FIGURE 3) of recess 29 extending generally rearwardly and upwardly of insert 10 in substantial parallelism with surface 27.

Receivable within the just described pocket 26 is a cutting bit or tip 30 of generally block-like configuration, as clearly shown in FIGURE 2. The bit 30 includes a rear face 31, a lower face 32, a forward face 33 and an upper face 34, with faces 31 and 32 respectively abutting the surfaces 28 and 27 when the bit is assembled in position on the shank 20 as shown in FIGURE 3. Side faces 30a and 30b (FIGURES 4, 5) are further shown extending transversely beyond sides 23 and 24 of shank 20.

For the purpose of effectuating connection between the bit 30 and the shank 20, the bit 30 is further shown as including a fixturing aperture 36 that extends between the front face 33 and the rear face 31. As will be noted from FIGURES 2 and 3, the fixturing aperture 36 is generally circular and it is important to note that the preferred embodiment of the invention envisions two structural features that should be noted with respect to the aperture 36.

First, it will be noted that the longitudinal axis X—X of aperture 36, while being shown parallel to longitudinal axis Y—Y of the recess 29, is offset radially therefrom by dimension Z.

Secondly, it will be noted that the diameter of the aperture 36 is considerably greater than the diameter of the recess 29, with both of these features serving to create the wedging and/or locking effect that will be obtained in the manner now to be described.

In this regard, and referring again to FIGURES 2 and 3, a fixturing pin, generally designated by the numeral 40 and being of generally nail-like configuration, is shown adapted to be driven into the longitudinally aligned fixturing recesses 36 and 29, with the shank portion 41 of pin 40 passing first through aperture 36 and then being snugly received in recess 29 as shown in FIGURE 3.

Because of the aforementioned misalignment between the axes of aperture 36 and recess 29, it is believed apparent that as the pin 40 penetrates into the fixturing recess 29 that there will be an interference between the tapered section 42 thereof and the mouth opening of the aperture 36. This interference will cause the head portion 43 (and the tapered connecting portion 42) to be distorted out of its original coaxial relationship with the shank 41 and the net effect of such wedging will be to deform the head 43 and thus firmly seat the bit 30 within the pocket 29 as clearly shown in FIGURE 3.

In order to facilitate brazing it will be noted that there is a slight spacing between head 43 and aperture 36 preferably provided in the region indicated by the numeral 45 in FIGURE 3, with it being found that the provision of such space permits the entrance of brazing material into the opening space between the head 43 and the aperture 36. Thus, the pin 40 serves as a fixturing pin cooperating with the fixturing recesses 29 and 36 with the fixturing components just described being spaced so as to permit entry of brazing material so as to effectuate a brazed joint between the abutting surfaces of bit 30 and pocket 26, with it being well known in the art of brazing that the brazing material will flow between the abutting surfaces if given access to the point of abutment as is here the case.

In use or operation of the improved method and apparatus just described, it is merely necessary that a supply of shanks, bits and pins be provided. Assembly of any one insert 10 merely involves initial locating of the bit 30 in the pocket followed by driving in the pin 40 much in the fashion that a nail is driven in place.

With the bit and shank assembled as just described, brazing material can be introduced to effectuate the actual brazing operation with the material entering through the opening 45 and flowing around the pin 40 to effectuate complete brazing of tip 30 to shank 20.

It is apparent from the foregoing that the pin 40 is expended during the brazing operation but such expenditure of the pin is of no commercial moment because of the low cost of the same. In fact, it has been found that expending of the pin in the fashion just described, enhances the rigidity and resultant performance of the insert 10 because the added rigidity and strength provided by the fixturing pin, which serves much as a reinforcing rod does in the pouring of concrete.

Following brazing, final machining can be achieved, with it being noted that only the front, side and top faces of the carbide tip need be machined with no machining of the shank being necessary in the preferred embodiment of the invention shown.

The modified form of the invention shown in FIGURE 6 of the drawings envisions a similar arrangement except that the axis of the recess 29a is angularly inclined with respect to the axis of the bore 36a. Thus, in this form of the invention the modified head 43a can wedge against the aperture 36a to achieve the same seating condition, with the fixturing pin again being expended during the course of brazing.

In all forms of the invention described to this point, it will be noted that the cutting edge 37 receives forces that extend downwardly and to the right of FIGURE 3 in the direction of arrow 50. It will be noted that this arrow points substantially in the direction of the point juncture of surfaces 27 and 28, which therefore serve as a V-pocket for receiving the cutting forces.

The modified form of the invention shown in FIGURES 7 and 8 illustrates utilization of the principles of the invention in accordance with the production of an improved milling cutter 70 having a plurality of cutting tips 71, 71 that are shown received in the pockets or cutouts 72, 72 that are located around the outer periphery in known fashion.

As shown in FIGURE 8, a pin 73 is received first through the fixturing aperture 71a of each tip 71, with the shank portion 73a thereof in turn being driven into a fixturing recess 72a that extends inwardly from the pocket 72. Again the recesses 71a and 72a have their axes transversely offset to create the pin deformation shown in FIGURE 8, with such wedging serving to fully seat the insert in position while yet permitting the same to be brazed in place as has previously been described.

It will be seen from the foregoing how there has been provided a new and improved type of cutoff tool that features a new and novel method of assembly resulting in the creation of a new and improved cutting tool, with the novelty of method and product resulting from the use of expendable fixturing means that are incorporated in the final product for the purpose of adding rigidity and strength to the same.

While a full and complete description of the invention has been set forth in accordance with the dictates of the patent statutes, it is to be understood that the invention is not intended to be limited to the specific forms herein shown.

Thus, while applications in the field of metal cutoff and sawing have been illustrated, it is to be understood that similar applications could be made in other fields of material cutting.

Accordingly, modifications of the invention may be resorted to without departing from the spirit hereof or the scope of the appended claims.

What is claimed is:
1. An elongate cutting insert of the character described, comprising:
(A) an elongate tool body having a forward portion that includes a front face and a top surface;
(B) a bit pocket
  (1) defined by said front face and said top surface,
  (2) having a rear wall that depends from said top surface to a transversely uniform depth;
  (3) and a bottom wall projecting rearwardly from said front face to a transversely uniform depth and to a point of juncture with said rear wall with said rear and bottom walls being joined at substantially right angles;
  (4) and having a fixturing recess in said rear wall;
(C) a cutting bit having:
  (1) a cutting edge;
  (2) and a fixturing aperture;
  (3) and being contoured to seat in said pocket with said cutting edge being disposed in cutting position with respect to said body during said seated condition;
  (4) said cutting edge being disposed in substantially opposed relationship with the point of juncture of said rear and bottom walls of said pocket;
(D) and a nail-like deformable fixturing pin:
  (1) having its shank portion passed through said fixturing aperture in said bit and received in said fixturing recess of said bit pocket:

(2) and having its head portion wedged in said fixturing aperture of said pocket upon insertion of its shank into said fixturing recess;

(3) whereby said pin retains said bit in seated condition in said pocket following said insertion of said pin;

(E) said tool being dynamically balanced with respect to the longitudinal center line of said insert when said bit is secured in place by said fixturing pin.

2. The cutting insert of claim 1 further characterized by the fact that said fixturing recess and said fixturing aperture have longitudinal axes that lie substantially along the longitudinal axis of said tool body and are vertically offset and angularly inclined with respect to each other.

3. The cutting insert of claim 1 further characterized by the fact that said fixturing recess and said fixturing aperture have longitudinal axes that lie substantially along the longitudinal axis of said tool body and are angularly inclined with respect to each other.

4. The cutting insert of claim 1 further characterized by the fact that said fixturing recess and said fixturing aperture have longitudinal axes that lie substantially along the longitudinal axis of said tool body and are vertically offset.

5. The device of claim 4 further characterized by the fact that said fixturing pin is angularly deformed during said wedging of said head portion thereof.

6. A circular cutter of the character described, comprising:

(A) a circular body having a plurality of cutting tooth regions disposed around the periphery thereof;

(B) a plurality of bit pockets;
(1) corresponding in number to the number of cutting tooth regions and opening into the periphery of said body;
(2) each having a rear and bottom wall joined at substantially right angles to each other;
(3) each having a fixturing recess in said rear wall;

(C) a plurality of cutting bits each having:
(1) a cutting edge;
(2) and a fixturing aperture;
(3) and being contoured to seal in said pocket with said cutting edge being disposed in cutting position with respect to said body during said seated condition;
(4) said cutting edges being disposed in substantially opposed relationship with the point of juncture of said rear and bottom walls of said pockets;

(D) and a nail-like deformable fixturing pin;
(1) having its shank portion passed through said fixturing aperture in said bit and received in said fixturing recess of said bit pocket;
(2) and having its head portion wedged in said fixturing aperture of said pocket upon insertion of its shank into said fixturing recess;
(3) whereby said pin retains said bit in seated condition in said pocket following said insertion of said pin;

(E) said tool being dynamically balanced with respect to the longitudinal center line of said insert when said bit is secured in placed by said fixturing pin.

7. An elongate insert of the character described, comprising:

(A) An elongate tool body having:
(1) a longitudinal center line;
(2) a top surface;
(3) a front surface extending transversely of said body and connecting with said top surface;
(4) opposed side surfaces located equidistant from said longitudinal center line;
(5) a bottom surface opposed to said top surface and having longitudinally extending guide means;
(6) a bit-receiving pocket defined by:
(a) a bottom surface extending generally rearwardly from said front planar surface to a transversely uniform depth;
(b) a rear surface extending generally downwardly from said top surface to a transversely uniform depth and a point of juncture with said bottom surface;
(c) with the depth of said rear surface from said top surface being greater than the depth of said bottom surface from said front surface;

(B) and a cutting tip;
(1) having rear and bottom surfaces adapted to seat in coplanar relationship with said rear and bottom surfaces of said bit-receiving edge;
(2) having a cutting edge extending transversely of said tool in opposed relationship to the juncture point of said rear and bottom edges of said bit and said pocket;
(3) and being brazed in place in said pocket;

(C) said tip being dynamically balanced with respect to said longitudinal center line of said body when brazed in place in said bit-receiving pocket.

8. The insert of claim 7 further characterized by the fact that said guide means are parallel to said longitudinal center line.

9. The insert of claim 7 further characterized by the fact that said cutting edge is parallel to the plane of said top surface.

10. The insert of claim 7 further characterized by the fact that said cutting edge lies within the projected plane of said top surface.

11. The insert of claim 7 further characterized by the fact that the angle between said rear and bottom surfaces does not exceed 90°.

12. The insert of claim 7 further characterized by the fact that the angle between said top surface of said tool body and said rear surface of said bit-receiving pocket is less than 90°.

13. An elongate insert of the character described, comprising:

(A) an elongate tool body having:
(1) a longitudinal center line;
(2) a top surface;
(3) a front surface extending transversely of said body and connecting with said top surface;
(4) opposed side surfaces located equidistant from said longitudinal center line;
(5) a bottom surface opposed to said top surface and having longitudinally extending guide means;
(6) a bit-receiving pocket defined by:
(a) a bottom surface extending generally rearwardly from said front planar surface to a transversely uniform depth;
(b) a rear surface extending generally downwardly from said top surface to a transversely uniform depth and a point of juncture with said bottom surface;
(c) with the depth of said rear surface from said top surface being greater than the depth of said bottom surface from said front surface;

(B) and a cutting tip:
(1) having rear and bottom surfaces adapted to seat in coplanar relationship with said rear and bottom surfaces of said bit-receiving edge;
(2) having a cutting edge extending transversely of said tool in opposed relationship to the juncture point of said rear and bottom edges of said bit and said pocket;

(C) fixturing means including:
    (1) at least one fixturing recess extending rearwardly from said rear wall;
    (2) at least one fixturing aperture extending rearwardly through said tip in longitudinal alignment with said fixturing recess;
    (3) and an elongate fixturing pin received through said aperture and within said recess whereby said bit is secured with respect to said tool body in said bit-receiving pocket thereof;
(D) said tip being dynamically balanced with respect to said longitudinal center line of said body when said tip is positioned in place in said bit receiving pocket by said fixturing pin.

14. An elongate insert of the character described, comprising:
(A) an elongate tool body having:
    (1) a longitudinal center line;
    (2) a top surface;
    (3) a front surface extending transversely of said body and connecting with said top surface;
    (4) opposed side surfaces located equidistant from said longitudinal center line;
    (5) a bottom surface opposed to said top surface and having longitudinally extending guide means;
    (6) a bit-receiving pocket defined by:
        (a) a bottom surface extending generally rearwardly from said front planar surface to a transversely uniform depth;
        (b) a rear surface extending generally downwardly from said top surface to a transversely uniform depth and a point of juncture with said bottom surface;
        (c) with the depth of said pocket from said top surface being greater than the top to bottom thickness of shank stock beneath said pocket;
(B) and a cutting tip:
    (1) having rear and bottom surfaces adapted to seat in coplanar relationship with said rear and bottom surfaces of said bit-receiving edge;
    (2) having a cutting edge extending transversely of said tool in opposed relationship to the juncture point of said rear and bottom edges of said bit and said pocket;
    (3) and being brazed in place in said pocket;
(C) said tip being dynamically balanced with respect to said longitudinal center line of said body when brazed in place in said bit-receiving pocket.

References Cited

UNITED STATES PATENTS

| | | | |
|---|---|---|---|
| 1,271,299 | 7/1918 | Fish | 29—95 |
| 1,908,161 | 5/1933 | Meutsch | 29—95 X |
| 1,912,666 | 6/1933 | Swanson | 29—95 |
| 1,974,215 | 9/1934 | Kilmer | 29—95 |
| 2,391,133 | 12/1945 | Cole | 29—95 |
| 2,453,959 | 11/1948 | Anthony | 29—96 |
| 2,641,049 | 6/1953 | Kennicott | 29—96 |
| 2,964,833 | 12/1960 | Novkov | 29—95 |
| 3,146,656 | 9/1964 | Richards | 29—96 X |
| 3,205,557 | 9/1965 | Frammelt et al. | 29—96 |
| 3,226,797 | 1/1966 | Hertel | 29—96 |
| 848,112 | 3/1907 | Matthews | 76—101 |
| 1,205,630 | 11/1916 | Hoglund | 76—101 |
| 1,838,520 | 12/1931 | Archer | 29—96 |
| 1,926,330 | 9/1933 | Cotton | 76—101 |
| 1,956,233 | 4/1934 | Braun | 29—95 |
| 2,354,144 | 7/1944 | Ross | 29—103 X |
| 2,758,363 | 8/1956 | Praeg | 29—105 |
| 3,173,191 | 3/1965 | Alexander | 29—96 |

HARRISON L. HINSON, Primary Examiner

U.S. Cl. X.R.

29—95, 105